United States Patent
Simonneau et al.

(10) Patent No.: US 9,331,783 B2
(45) Date of Patent: May 3, 2016

(54) METHOD FOR COMPENSATING CHROMATIC DISPERSION AND ASSOCIATED EQUIPMENT

(71) Applicant: Alcatel Lucent, Boulogne Billancourt (FR)

(72) Inventors: Christian Simonneau, Nozay (FR); Yvan Pointurier, Nozay (FR); Francesco Vacondio, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 22 days.

(21) Appl. No.: 14/387,295

(22) PCT Filed: Feb. 20, 2013

(86) PCT No.: PCT/EP2013/053306
§ 371 (c)(1),
(2) Date: Sep. 23, 2014

(87) PCT Pub. No.: WO2013/149760
PCT Pub. Date: Oct. 10, 2013

(65) Prior Publication Data
US 2015/0043917 A1 Feb. 12, 2015

(30) Foreign Application Priority Data
Apr. 5, 2012 (EP) .................................. 12290124

(51) Int. Cl.
*H04B 10/2513* (2013.01)
*H04B 10/07* (2013.01)
(Continued)

(52) U.S. Cl.
CPC ............ *H04B 10/2513* (2013.01); *H04B 10/07* (2013.01); *H04B 10/07951* (2013.01);
(Continued)

(58) Field of Classification Search
CPC .................................................. H04B 10/2513
See application file for complete search history.

(56) References Cited

U.S. PATENT DOCUMENTS 7,031,613 B1    4/2006   Mazzini et al.
7,613,397 B2 *  11/2009  Nakamura ......... H04B 10/2525
                                                398/81

(Continued)

FOREIGN PATENT DOCUMENTS

EP      2249493      11/2010
JP      H07212347    8/1995

(Continued)

OTHER PUBLICATIONS

Fazal, I. et al; Optical data packet synchronization and multiplexing using a tunable optical delay based on wavelength conversion and inter-channel chromatic dispersion; Aug. 20, 2007; XP055041362; Retrieved from the Internet: URL:http://www.opticsinfobase.org/DirectPDFAccess/538D5BF0-93F1-5CB4-408E79249C8C7EA8_140629/oe-15-17-10492.pdf?da=1&id=140629&seq=0&mobile=no [retrieved on Oct. 17, 2012].
Chiaroni, D. et al; Packet OADMs for the next generation of ring networks; Bell Labs Technical Journal; Wiley, CA; US; vol. 14, No. 4; Jan. 4, 2010; pp. 265-283; XP001552054; ISSN: 1089-7089, DOI: 10.1002/BLTJ.20415 [retrieved on Feb. 23, 2010].

*Primary Examiner* — Shi K Li
(74) *Attorney, Agent, or Firm* — Patti & Malvone Law Group, LLC

(57) ABSTRACT

A method and device for compensating, within a node of an optical network, chromatic dispersion undergone by optical packets transmitted within time slots of wavelength division multiplexed channels along at least one link of the optical network, a time slot duration corresponding to the sum of a packet duration and an inter-packet gap duration. The method and device demultiplexes the wavelength division multiplexed channels into a plurality of bands, and transmits the bands, via a respective plurality of delay lines having predetermined delays, toward a respective plurality of packet add/drop structures comprising a coherent receiver.

13 Claims, 13 Drawing Sheets

(51) Int. Cl.
*H04B 10/079* (2013.01)
*H04B 10/61* (2013.01)
*H04J 14/02* (2006.01)
*H04Q 11/00* (2006.01)

(52) U.S. Cl.
CPC ............ *H04B10/61* (2013.01); *H04B 10/6161* (2013.01); *H04J 14/02* (2013.01); *H04J 14/0201* (2013.01); *H04J 14/0209* (2013.01); *H04J 14/0212* (2013.01); *H04J 14/0275* (2013.01); *H04Q 11/0066* (2013.01)

(56) References Cited

U.S. PATENT DOCUMENTS

2009/0324224 A1 12/2009 Xie
2011/0026927 A1 2/2011 Tanaka et al.

FOREIGN PATENT DOCUMENTS

JP 2001292101 10/2001
WO 01/86841 11/2001

* cited by examiner

METHOD FOR COMPENSATING CHROMATIC DISPERSION AND ASSOCIATED EQUIPMENT

BACKGROUND OF THE INVENTION

The present invention relates to the field of wavelength division multiplexing optical networks with packet granularity capability and coherent detection and more particularly to the chromatic dispersion compensation in such networks.

A wavelength division multiplexing optical network refers to a network comprising a plurality of nodes connected by optical links wherein data signals are transmitted through a plurality of channels having different wavelengths and which are multiplexed to be transmitted through the optical links of the network.

Packet granularity or packet switching granularity refers to the possibility to add or drop one or several optical packets of a signal in an intermediary node while transmitting the other packets transparently. In such networks, the packets are usually transmitted within time slots so that the packets of the different channels are synchronized.

Equipments with packet granularity capability are more and more implemented in the optical communication network in order to enhance the flexibility of communication networks. Such equipments are referred to as packet optical add-drop multiplexers (POADMs). However, a POADM requires compensating for the chromatic dispersion induced by the transmission of optical packets through links of the network.

Indeed, one aspect of the chromatic dispersion called inter-channel chromatic dispersion refers to the fact that packets transmitted in channels of different wavelengths experience different travelling speeds so that time shifts or time offsets are introduced between packets emitted simultaneously. Need is then to resynchronize the packets to enable their processing at the receiver.

Besides, another aspect of the chromatic dispersion called intra-channel chromatic dispersion refers to the distortion undergone by the signal representing the bit coding of a packet during its transmission through the links of the network, rendering the bit decoding difficult and possibly erroneous.

One way to compensate for both aspects of the chromatic dispersion is to use in-line compensators located along the links of the network. However, in-line components introduce additional losses that need to be compensated by additional amplifiers. Moreover, such amplifiers introduce additional costs and generate additional noise so that the distance that can be reached transparently with a given quality of signal may be reduced.

SUMMARY OF THE INVENTION

It is therefore an object of the present invention to overcome the above mentioned drawbacks of the state of the art and to provide a solution to compensate for the chromatic dispersion in wavelength division multiplexing without using in-line components.

Thus, the present invention refers to a method for compensating, within a node of an optical network, chromatic dispersion undergone by optical packets transmitted within time slots of wavelength division multiplexed channels along at least one link of the optical network, a time slot duration corresponding to the sum of a packet duration and an inter-packet gap duration, the said method comprising the followings steps:

demultiplexing the wavelength division multiplexed channels into a plurality of bands, a band comprising a predetermined number of adjacent wavelength channels, transmitting the said plurality of bands, via a respective plurality of delay lines having predetermined delays, toward a respective plurality of packet add/drop structures comprising a coherent receiver, wherein the said predetermined number of channels of one band is determined so that a first time shift, due to the effect of the chromatic dispersion along transmission through the network, between two optical packets of the same time slot sent respectively in different channels of the same band, remains shorter than an inter-packet gap duration and so that the coherent receiver is capable of processing the said predetermined number of channels of one band, wherein the predetermined delay of a delay line associated with a band of channels corresponds to a second time shift between a channel of the said associated band and a reference channel, the said second time shift being due to the effects of chromatic dispersion along the last crossed link.

The embodiments of the present invention also refer to a packet optical add/drop multiplexer located in a node of a wavelength division multiplexing optical network and configured to process optical packets transmitted within time slots having a duration corresponding to a packet duration and an inter-packet gap duration along links of the optical network and received from remote nodes of the optical network, the said packet optical add/drop multiplexer comprising:

a plurality of packet add/drop structures comprising a coherent receiver, a band demultiplexer configured for demultiplexing the received multiplexed channels into a plurality of bands, a band comprising a predetermined number of adjacent channels, the said predetermined number of channels being determined so that a first time shift, due to the effect of the chromatic dispersion along transmission through the network, between two packets sent respectively in a first and a second channel of the band, remains shorter than an inter-packet gap and so that the coherent receiver is capable of processing the said predetermined number of channels, a plurality of delay lines having predetermined delays, the plurality of bands being transmitted respectively to the plurality of packet add/drop structures via the said plurality of delay lines, the predetermined delay of a delay line associated with a band being determined according to a second time shift between a channel of the associated band and a reference channel, the said second time shift being due to the effects of chromatic dispersion along the last crossed link.

The embodiments of the present invention also refer to an optical node of a wavelength division multiplexing optical network comprising a plurality of nodes linked by optical links comprising:

a data repository configured for storing information about the topography of the links adjacent to the node, a packet optical add/drop multiplexer wherein a dedicated receiver is configured for updating information about the chromatic dispersion undergone by the optical packets transmitted on other channels than the control channel based on the information about the topography of the links adjacent to the node stored in the data repository.

Figure 1:
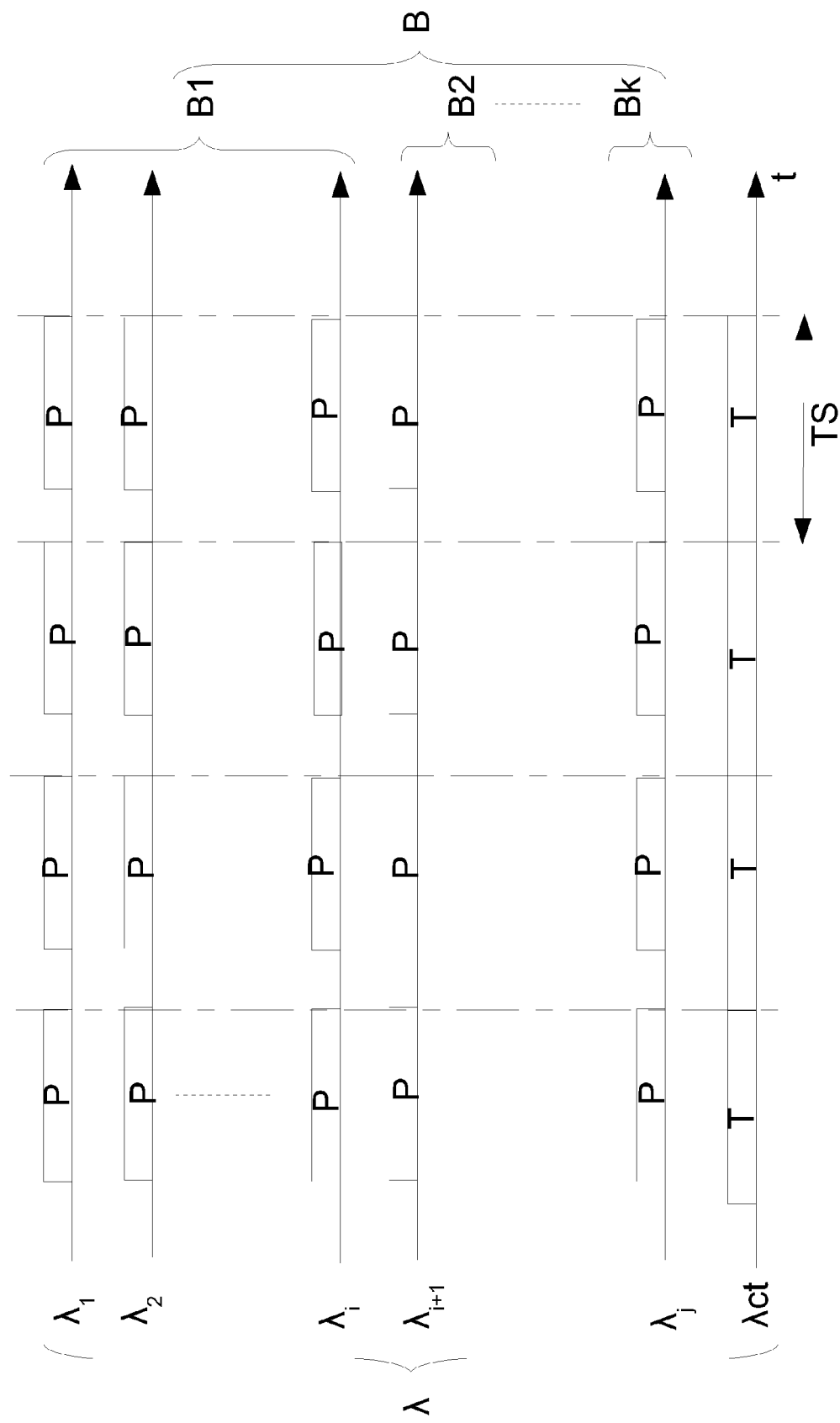
FIG. 1 is a diagram of the arrangement of the packets in their time slots in the different channels of the different bands of a WDM signal.

In these drawings, the elements having the same reference correspond to elements having a similar function. When a reference is composed of a reference number and an index, the reference number represent a class of elements having a similar function while the index designate a particular element of the class. For example, the elements $13_1$ and $13_2$ refer both to delay lines but the element $13_1$ may have a delay that is different than the element $13_2$.

DETAILED DESCRIPTION OF THE INVENTION

As used herein, the term "WSS" refers to the acronym Wavelength Selective Switch;

As used herein, the term "ROADM" refers to the acronym Reconfigurable Optical Add-Drop Multiplexer;

As used herein, the term "POADM" refers to the acronym Packet Optical Add-Drop Multiplexer;

As used herein, the term "SOA" refers to the acronym Semiconductor Optical Amplifier;

As used herein the term "inter-packet gap" in a packet stream refers to the guard interval which separates two consecutive packets transmitted on a common wavelength channel;

As used herein the term "band" refers to a wavelength interval, usually gathering a plurality of wavelength channels;

As used herein, the term "time slot" in a packet stream transmitted in a channel refers to a time interval wherein a packet is inserted. The time slot duration corresponds to the sum of a packet duration and an inter-packet gap duration.

As used herein the term "FIR filter" refers to the acronym Finite Impulse Response filter which is a filter whose impulse response (or response to any finite length input) is of finite duration.

As used herein, the terms "ingress node and egress node" of a signal refer respectively to the source node from which the signal is emitted (after being converted from the electrical to the optical domain) and the destination node in which the signal is received (and is converted from the optical to the electrical domain).

As used herein, the term "transparent" to qualify a path or a transmission refers to the transmission (or path) of an optical signal without performing any optical-electrical-optical (OEO) conversion.

As used herein, the term "optical packet" refers to an optical signal corresponding to a block of a predetermined amount of data (or predetermined number of bits) encoded according to a coding scheme and modulated according to a predetermined modulation format.

As used herein, the term "dropped packet" refers to a packet for which the current node is the egress node so that the said packet is detected by a receiver and the data of the packet are decoded by the receiver. Inversely, the non-dropped packets are transmitted transparently toward another node.

As used herein the expression "Gb/s" refers to the unit giga-bit per second.

The embodiments of the present invention refer to a method for compensating chromatic dispersion undergone by packets transmitted in time slots of wavelength division multiplexed (WDM) channels through the links of a network wherein inter-channel and intra-channel chromatic dispersion are compensated in the nodes of the network and separately, the inter-channel chromatic dispersion being compensated thanks to delay lines while the intra-channel chromatic dispersion being compensated by digital signal processing techniques. Furthermore, an aspect of the present invention is to process the received WDM channels per band in order to reduce the capital expenditure required to implement the inter-channel chromatic dispersion compensation.

The method is based on coherent detection wherein the packets transmitted at different times by several channels can be detected by a single coherent receiver without requiring additional filtering elements.

With time slotted transmissions, optical packets belonging to a common time slot (and therefore to different channels) are emitted simultaneously (with different transmitters) whereas optical packets belonging to different time slots (on the same or on different channels) are emitted at different times as described in FIG. 1 where a set of j wavelength channels λ distributed in k bands B of i channels is represented. Each channel is timely divided into successive time slots TS of duration ΔT wherein the packets P are introduced. An additional channel λct refers to the control channel that transmits the header of the packets P transmitted in the other channels $\lambda_{1 \ldots j}$ than the control channel λct. The control channel λct is a circuit switching channel and therefore does not comprise packets but a continuous flow of data organized in frames T of length TS.

Nevertheless, the time shifts or time offsets introduced between the channels by the effects of the inter-channel chromatic dispersion during transmission along the links of the network may lead to a temporal overlapping of the packets transmitted in different time slots through different channels.

However, as the introduced time shift is proportional to the wavelength difference of the channels, for adjacent channels having close wavelengths, herein the channels of a common band B, the introduced time offset remains very small.

Furthermore, a packet stream transmitted within a channel comprises a succession of time slots, each time slot comprising a data packet and an inter-packet gap or guard interval which is used to separate two successive packets. Thus, if a packet is time shifted of a duration that is shorter than the inter-packet gap, this time shifted packet remains in the time slot and can therefore be processed normally by the receiver. The inter-packet gap can be seen as a tolerance in the synchronization of the packets. As a consequence, if the time shift introduced by inter-channel chromatic dispersion between channels having close wavelengths remains smaller than the inter-packet gap, the receiver is still capable of processing correctly the time shifted packets.

Besides, the number of channels that a coherent receiver is able to process without introducing too much loss is also limited, for example ten channels with coherent receivers of the state of the art.

As a consequence, if the time shift introduced within ten adjacent channels along the transmission is less than an inter-packet gap, the packets transmitted in these channels can be detected by a receiver without requiring compensating individually for the inter-channel chromatic dispersion of each channel.

Figure 2:
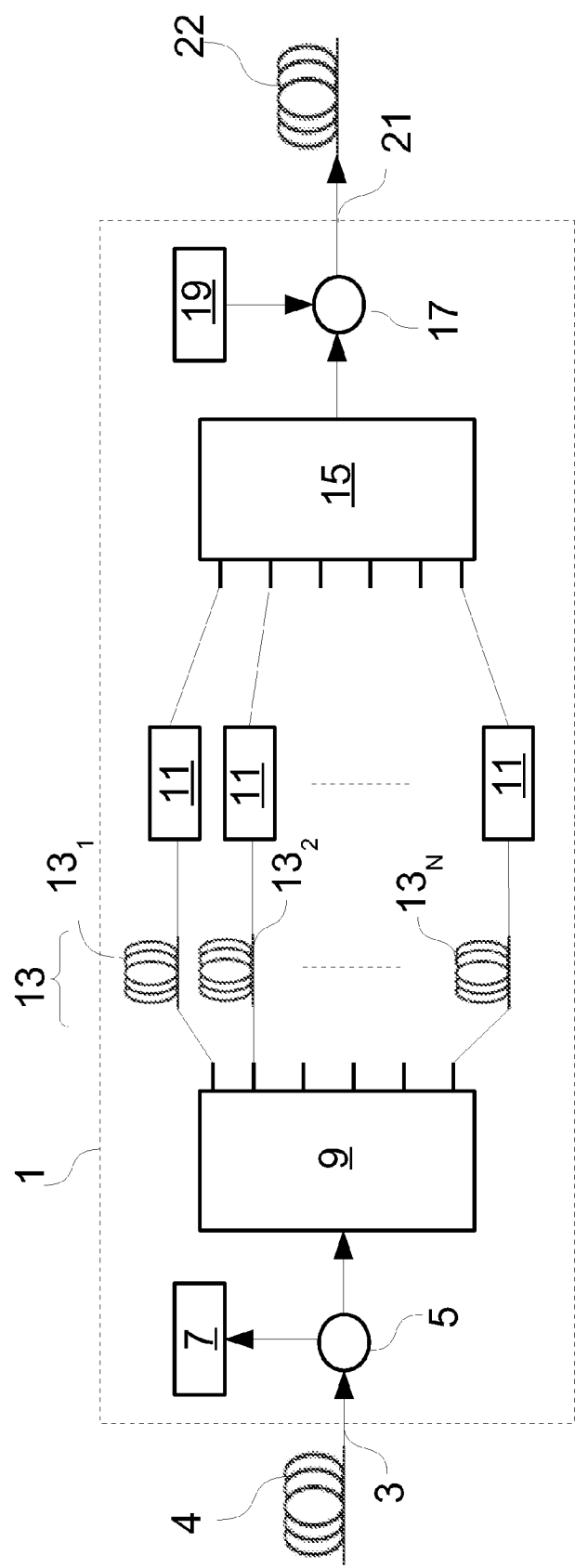
FIG. 2 is a diagram of a packet optical add-drop multiplexer according to an embodiment of the present invention.

FIG. 2 represent a packet add/drop multiplexer (POADM) 1 according to an embodiment of the present invention. The POADM 1 is aimed at being implemented in the nodes of the network and comprises an input 3 which is linked to an optical link 4, generally implemented as an optical fibre, along which the signals comprising the Wavelength Division Multiplexed (WDM) channels are transmitted. The input 3 of the POADM 1 is linked to an optical coupler 5 that transmits the WDM channels on one side toward a dedicated receiver 7 and on the other side to an input of a band demultiplexer 9. This coupler may be replaced by a channel demultiplexer with the advantage of presenting a lower loss.

The dedicated receiver 7 is aimed at detecting the control channel, which is preferably a channel located at a border of the spectrum comprising all the transmitted WDM channels. The control channel transmits information concerning the packets transmitted on the other wavelengths than the control channel, i.e. their header, and notably the value of the chromatic dispersion undergone by the packets of the other channels than the control channel. The control channel may be a channel with a reduced throughput with respect to the other channels, for example 2.5 Gb/s for the control channel while the other channels may have a 10 Gb/s throughput.

The dedicated receiver 7 is preferably a non-coherent receiver in order to reduce the cost of this dedicated receiver 7. In such case, a filter is implemented at the input of the dedicated receiver 7 in order to filter out the channels that do not correspond to the control channel. If the coupler 5 is replaced by a channel demultiplexer, no filter is necessary. Furthermore, the control channel is demodulated and decoded at each node. As a consequence, the cumulated chromatic dispersion of the control channel is limited and corresponds to the chromatic dispersion undergone across the last link. Thus, if the throughput is reduced, a modulation format which is robust to impairments such as an on-off keying (OOK) format can be used. In such case, detection can be achieved without chromatic dispersion compensation. However, if a higher throughput is requested, or if the length of the links is longer than what is typically used in core networks, compensation techniques of the state of the art can be implemented such as a fibre Bragg grating or a maximum-likelihood sequence estimation.

Besides, as the time for the dedicated receiver to detect and process the data transmitted in the control channel $\lambda$ct may not be negligible with respect to a packet duration, these detection and processing need to be performed in advance with respect to the processing of the packets transmitted in the other channels for which information about the chromatic dispersion is transmitted in the control channel. Two solutions may be applied to solve this issue, either information about the chromatic dispersion undergone by dropped packets transmitted in a given time slot is transmitted in a previous time slot of the control channel or a delay line is added, for example between the optical coupler 5 and the band demultiplexer 9 in the POADM 1 presented in FIG. 2, the delay of this delay line corresponding to the time necessary for the dedicated receiver to process a packet of the control channel.

The band demultiplexer 9 comprises a plurality of outputs linked respectively to a plurality of packet add/drop structures 11 via a respective plurality of delay lines $13_x$ (x=1, ..., N) having predetermined delays. The fundamental idea is to gather in one band the channels having undergone a relative time offset between each other due to the inter-channel chromatic dispersion that is smaller than the inter-packet gap duration $\Delta t$. The WDM channels are demultiplexed by bands, each band comprising a predetermined number of channels, and one band is transmitted toward one packet add/drop structure 11 via one delay line $13_x$ (x=1, ..., N) implemented for instance as a piece of optical fibre of a predetermined length. The predetermined delay, i.e. the length, of a delay line $13_x$ (x=1, ..., N) associated with one band is determined based on the inter-channel chromatic dispersion undergone by the channels of that band on the last crossed link, i.e. from the previous node. The delay of a delay line $13_x$ (x=1, ..., N) corresponds to the time offset introduced by the inter-channel chromatic dispersion between one channel of the band and a reference channel, for instance the control channel.

The output of the packet add/drop structures 11 are linked respectively to the inputs of a band multiplexer 15 that re-multiplex the plurality of bands in a single WDM signal. The output of the band multiplexer 15 is linked to a first input of an optical coupler 17. A second input of the optical coupler 17 is linked to a dedicated transmitter 19 configured for encoding and modulating the packets of the control channel. The output of the optical coupler 17 is linked to the output 21 of the POADM 1 towards an optical link 22.

Figure 3:
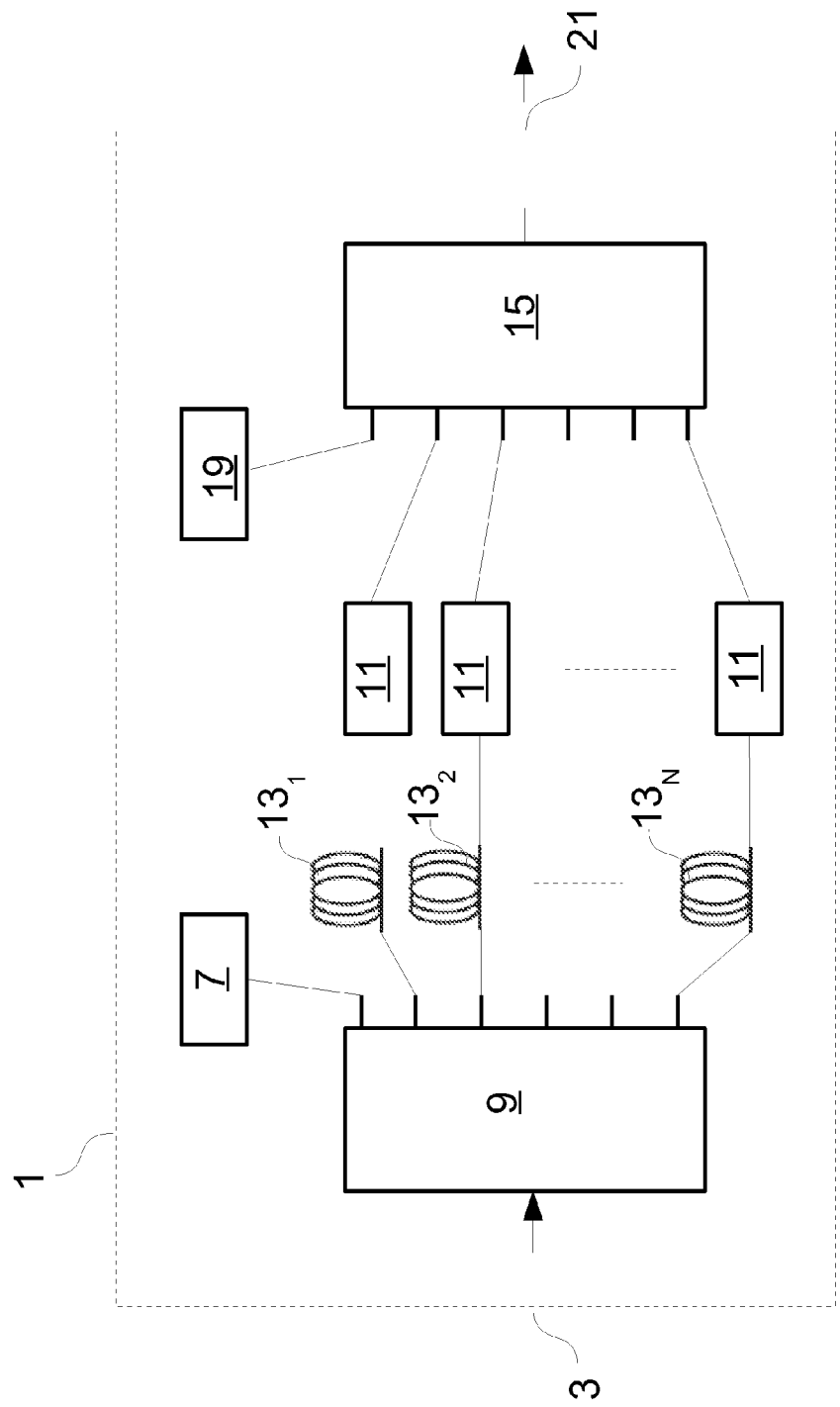
FIG. 3 is a diagram of a packet optical add-drop multiplexer according to another embodiment of the present invention.

According to another embodiment represented in FIG. 3, the input 3 of the POADM 1 is linked directly to a band demultiplexer 9 and the dedicated receiver 7 is located behind the band demultiplexer 9 so that one output of the band demultiplexer 9 is linked to the dedicated receiver 7. The band demultiplexer 9 is then configured to send the control channel to the output linked to the dedicated receiver 7 and the plurality of bands towards the respective plurality of packet add/drop structures 11 via the plurality of delay line. In such configuration, no optical coupler 5 and no filter is required at the input of the dedicated receiver 7 as only the control channel is transmitted by the band demultiplexer 9. In the same way, the dedicated transmitter 19 is linked to an input of the band multiplexer 15 to be re-multiplexed with the plurality of bands and the output of the band multiplexer 15 is linked directly to the output 21 of the POADM 1 so that the optical coupler 17 is not necessary anymore.

Figure 4:
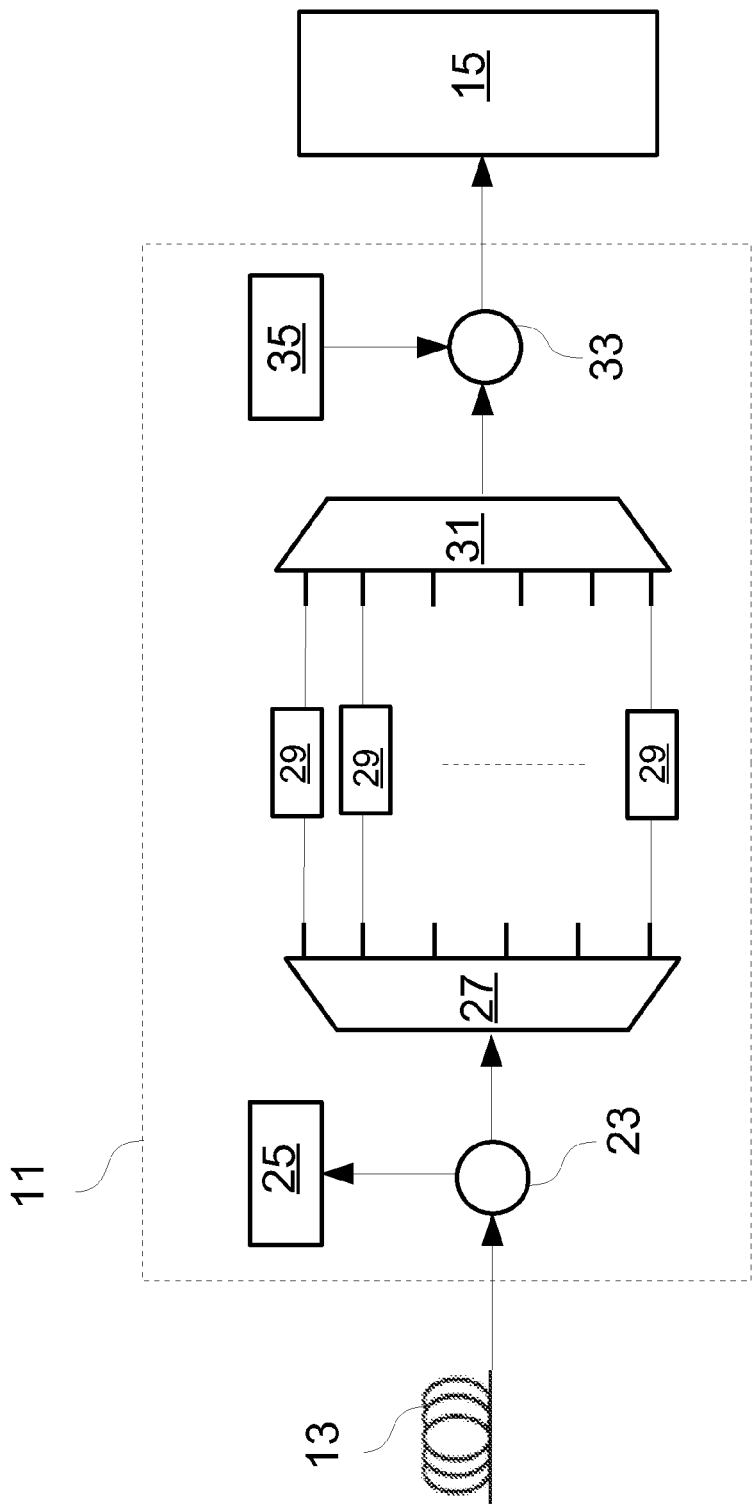
FIG. 4 is a diagram of a packet optical add-drop structure according to an embodiment of the present invention.

FIG. 4 represents a diagram of a packet add/drop structure 11 according to an embodiment of the present invention. It comprises an optical coupler 23 having an input that corresponds to the input of the packet add/drop structure 11 and is therefore linked to a delay line $13_x$ (x=1, ..., N). The optical coupler 23 has two outputs, one linked to a coherent receiver 25 and the other linked to a demultiplexer 27. The use of a coherent receiver is important in order to compensate for the intra-channel chromatic dispersion which will be described in details in the following of the description. Thus, the band received from the delay line $13_x$ (x=1, ..., N) is sent toward both the coherent receiver 25 and the demultiplexer 27. The demultiplexer 27 is configured for demultiplexing the band received at its input into a plurality of individual channels. The outputs of the demultiplexer 27 are linked respectively to the inputs of a multiplexer 31 via a plurality of optical gates 29. The optical gates 29 could be configured to block the data of the time slots corresponding to the packets being dropped in the node in order to "free" these time slots and to enable adding new packets in this time slots and to let the non-dropped packet through. The dropped packets are detected by the coherent receiver 25. The optical gates 29 are implemented preferably as semiconductor optical amplifier (SOA) gates. Indeed, other technologies such as Mach-Zehnder modulators (MZM), ring resonators, acousto-optic switches, liquid crystal on silicon (LCoS) or micro-electromechanical systems (MEMS) could also be used but in the state of the art, these components have drawbacks for the present application such as a slow functioning with respect to a packet duration or a low blocking efficiency that currently prevent their utilization.

The multiplexer 31 is configured to re-multiplex the individual channels in a band. The output of the multiplexer 31 is linked to an input of an optical coupler 33 which has a second input linked to a transmitter 35. The transmitter 35 is configured to transmit packets aimed at being introduced in the free time slots of the band. The continuous wave (CW) laser used in the transmitter 35 may be implemented as a fast tunable CW laser. Alternatively, an array of lasers emitting at wavelength corresponding to the channels of the band and coupled to a fast selector that selects, for each time slot, the laser corresponding to the wavelength that needs to be transmitted can be implemented. The optical coupler 33 mixes the optical signals received from the multiplexer 31 and from the transmitter 35 so that the packets coming from the transmitter 35 are introduced within the free time slots of the band received from the multiplexer 31. The output of the optical coupler 33 corresponds to the output of the packet add/drop structure 11 and is linked to the band multiplexer 15.

The band demultiplexer 9 and the band multiplexer 15, will be preferably implemented as low cost fixed band demultiplexers based on thin film filter or silica technology. The demultiplexer 27 and the multiplexer 31 will be preferably implemented as array waveguide gratings (AWG). This AWG could be realized with different technology such as III-V semiconductor or silicon photonics. These two technologies could enable the complete integration of the multiplexer, the demultiplexer and the optical gates. Alternatively, these equipments may also be implemented as Wavelength Selective Switches (WSS) based on electromechanical systems (MEMS) or liquid crystals on silicon (LcoS).

Thus, a band transmitted along a delay line 13 is received by the coherent receiver 25 and the packets aimed at being dropped are detected by this coherent receiver 25. It has to be noted that, if a packet add/drop structure 11 comprises only one coherent receiver 25, within one time slot, only one packet of one channel can be detected so that if two packets have a common egress node, these two packets have to be transmitted either within two different bands or in two different time slots. Such issue may obviously be overcome by implementing a plurality of receivers per packet add/drop structure 11.

Figure 5:
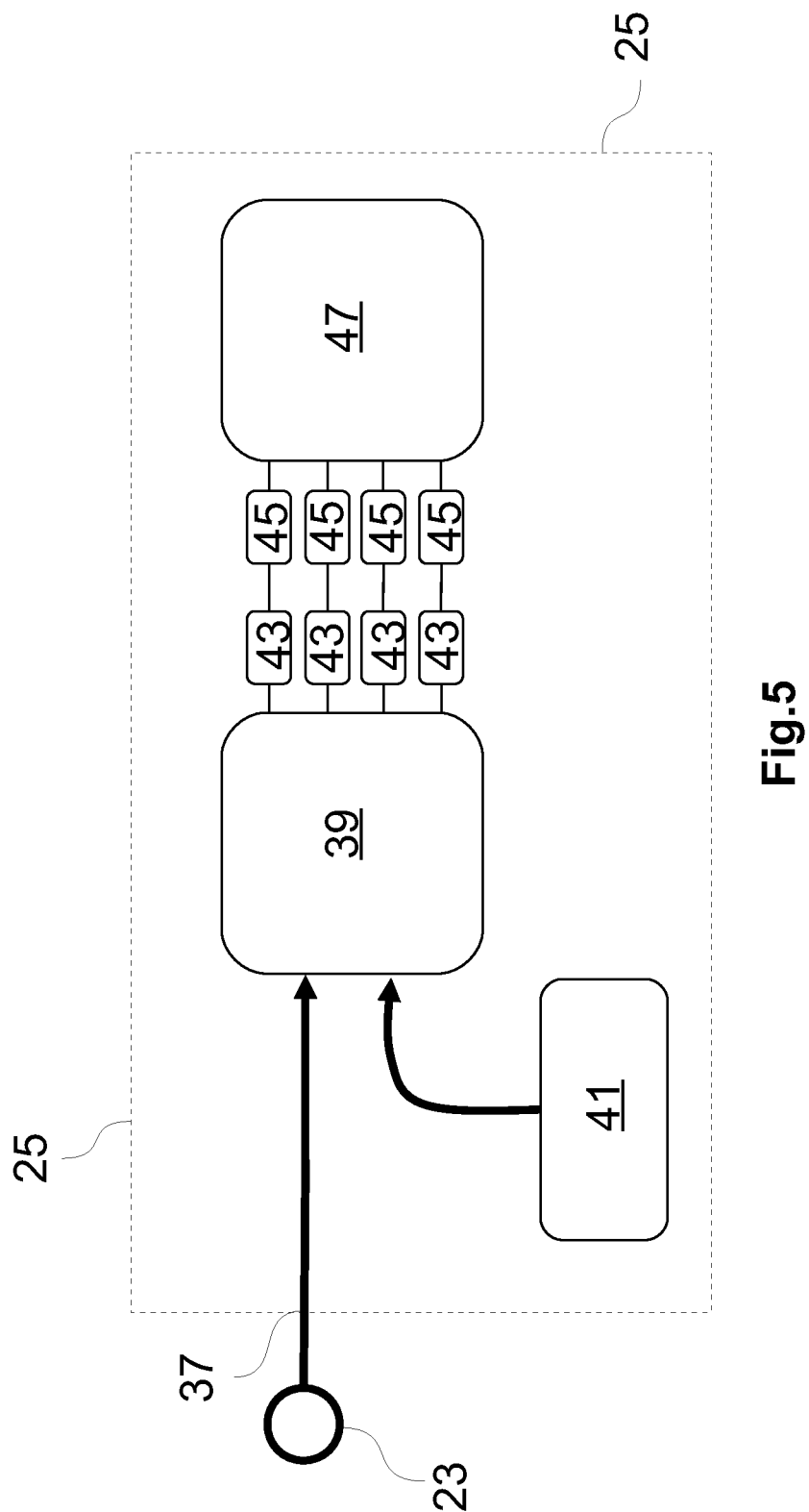
FIG. 5 is a diagram of a coherent receiver according to an embodiment of the present invention.

FIG. 5 represents the functional elements of an embodiment of a coherent receiver 25 located in a packet add/drop structure 11 described in FIG. 4.

The coherent receiver 25 comprises an input 37 which is connected to the optical coupler 23 and that receives a band comprising a predetermined number of multiplexed channels. The input 37 is linked to a first input of a coherent mixer 39. The second input of the coherent mixer 39 is linked to a local oscillator 41 implemented as a fast tunable laser which is tuned, for each time slot, to the wavelength corresponding to the channel of the band that comprises a packet that needs to be dropped. Similarly to a transmitter 35, the local oscillator 41 may be implemented by an array of lasers emitting a set of wavelengths corresponding to the channels of the band and coupled to a fast selector (the number of lasers in the array being equal to the number of channels in the band).

The coherent mixer 39 comprises for instance a polarization beam splitter (PBS), a 50/50 optical splitter, and two 90° optical hybrids. The polarization beam splitter is configured for splitting the signal received at the input into two signals having orthogonal polarizations. The 50/50 optical splitter is configured to split the signal received from the local oscillator 41 in two signals having half power each. One output of the PBS and one output of the 50/50 splitter are sent to a 90° hybrid coupler. The other PBS output and the other output of the 50/50 splitter are sent to the second 90° optical hybrid. Therefore, the inphase and quadrature components of both polarizations are retrieved at the outputs of the coherent mixer 39. These four components are then detected by four photo-detectors 43, generally implemented as balanced photo-diodes, which are linked respectively to four analogical to digital (A/D) converters 45. The obtained four digital signals are then used to feed digital signal processing means 47.

The digital processing means 47 comprise an electronic dispersion compensation module and an adaptive equalizer. The electronic dispersion compensation module comprises a digital filter which is configured to compensate for the degradations (i.e. distortions) of the received signal due to the intra-channel chromatic dispersion. These distortions depend on the total intra-channel chromatic dispersion accumulated by a packet during its transparent propagation along the links of the network. These distortions can therefore be different for each packet depending on the path that has been followed. The intra-channel chromatic dispersion can be described in the frequency domain as an all-pass transfer function herein noted $H_{DISP}$ and defined by:

$$H_{DISP} = e^{-j\frac{D\lambda^2}{4\pi c}w^2}$$

with c the speed of light in vacuum, $\lambda$, the wavelength of the signal, w the angular frequency and D the chromatic dispersion value defined by $D=L\beta$ with L the length of the optical fibre, $\beta$ a constant that depends on the type of the optical fibre and j the complex number with unit modulus and angle of $\pi/2$. Thus, in order to compensate for the effects of the intra-channel chromatic dispersion, the digital filter of the electronic dispersion compensation module is configured to have a transfer function that is the inverse of $H_{DISP}$ (i.e. $H_{DISP}^{-1}$). Such filter may be implemented in the time or the frequency domain, using recursive or non-recursive filters. Furthermore, to configure the digital filter, the chromatic dispersion value D needs to be known. However, such value cannot be measured in a packet granularity application due to the too long duration of the measurement with respect to a packet duration. In order to overcome this problem, the value of the chromatic dispersion is transmitted within the control channel. Indeed, the dedicated receiver 7 is configured to retrieve the information transmitted in the control channel and in particular the value of the chromatic dispersion undergone by the dropped packets and also to transmit this retrieved value to the coherent receiver 25 which detects these dropped packets. As a consequence, the chromatic dispersion value provided by the dedicated receiver is used by the electronic dispersion compensation module of the coherent receiver 25 to configure its digital filter and to compute the value of D in the transfer function.

In order to obtain, within the control channel, an estimation of the chromatic dispersion undergone by a packet at its egress node, the information concerning this chromatic dispersion is initially set to 0 and is updated in each node along the path of the signal.

Indeed, it is assumed that the topography of the network (length and type of the optical fibres along the links) is determined and stored in a data repository at network building time. This data repository may be part of a centralized entity of the network such as a network management system that distributes the local topologies to the nodes of the network via control plane mechanisms. Such organization enables the storage, within each node, of the topography of the adjacent links. As a consequence, the estimation of the chromatic dispersion undergone by the signals along the last (or the next) crossed link can be determined within each node based on the topography information stored in a data repository of the node.

Thus, after (or before) each link of the path, the values of the chromatic dispersion undergone by the packets of the other channels than the control channel which are encoded in the control channel are updated by adding the value associated with the last (or next) crossed link. The cumulated value of the chromatic dispersion along the path is therefore obtained at the egress node. Indeed, as the control channel is detected in each node, the values transmitted in the control channel can be updated (by adding the value corresponding to the last link) and such updates do not introduce any additional conversion or loss for the data packets transmitted on the other channels (which can still be transmitted transparently across the network).

In order for the digital filter to produce a transfer function that is the inverse of $H_{DISP}$, its taps weights have to be determined.

In the case of a non-recursive filter implemented in the time domain with an odd number N of taps, the tap weights are given by:

$$a_k = \sqrt{\frac{jcT^2}{D\lambda^2}} e^{-j\frac{\pi cT^2}{D\lambda^2}k^2}$$

For k=1 ... N, where T is a symbol duration, and $$-\frac{N}{2} \ k \ \frac{N}{2} \text{ where } \frac{N}{2}$$

is the integer part of N/2 rounded towards minus infinity. Thus, the tap weights can be computed based on the chromatic dispersion value transmitted provided in the control channel. If this computation is too long, a set of possible chromatic dispersion values and the associated tap weights may be stored in a data repository such as a look-up table of the node. As a consequence, as no measurement of the chromatic dispersion is needed and as only limited or no computation is required to determine the tap weights of the FIR filter, the electronic dispersion compensation module described herein enables a fast compensation of the intra-channel chromatic dispersion.

Besides, other physical impairments such as polarization mode dispersion or transceiver induced inter-symbol interference introduce signal degradation and need to be compensated for.

Figure 6:
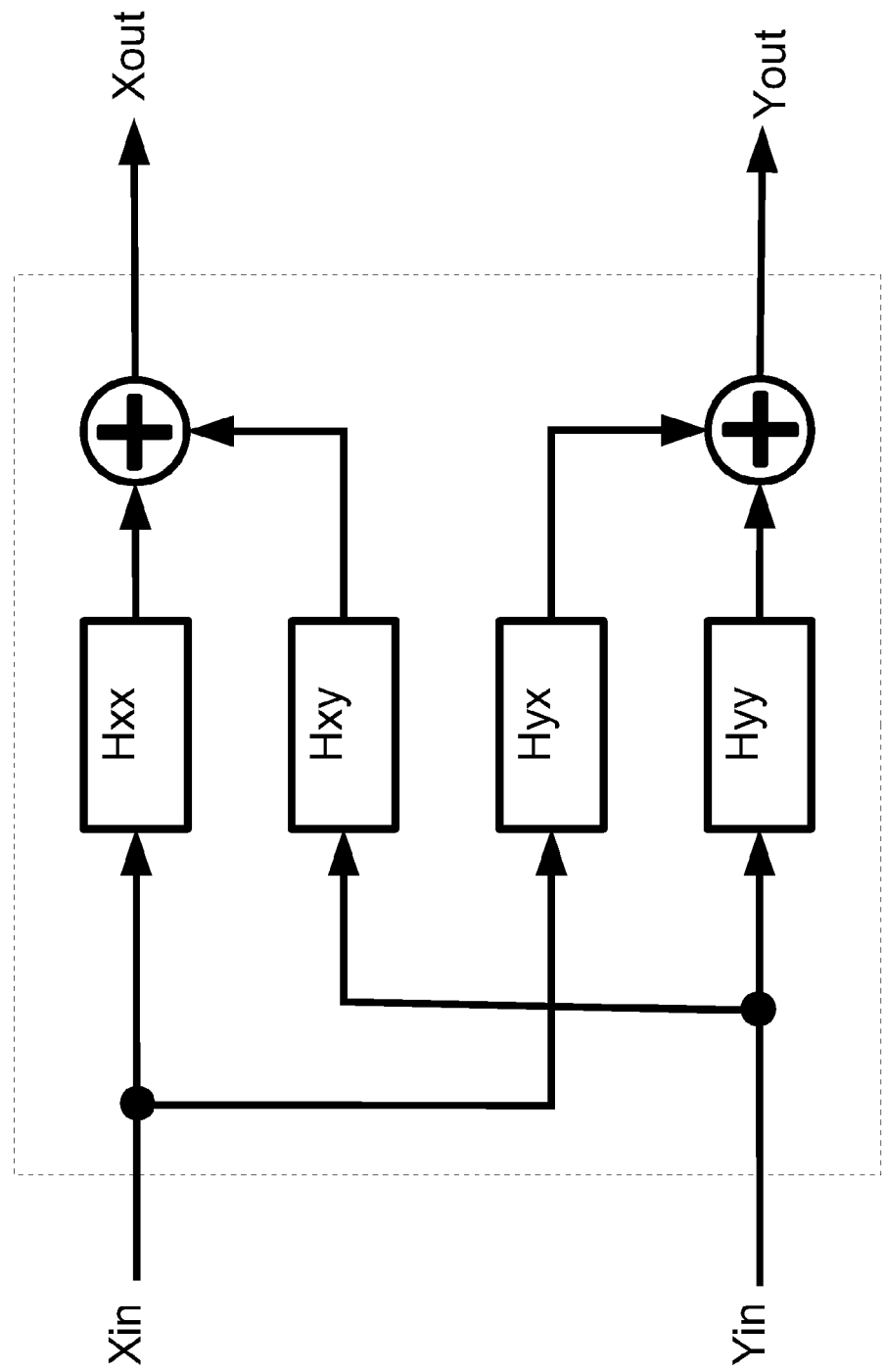
FIG. 6 is a diagram of multiple input multiple output adaptive equalizer with four finite impulse response (FIR) filters.

This is achieved by an adaptive equalizer which is located at the output of the electronic compensation module. The adaptive equalizer can be implemented with a multiple-input multiple output (MIMO) time domain array of complex adaptive finite impulse response (FIR) digital filters arranged in a butterfly structure such as described in FIG. 6 with an array of four FIR filters noted Hxx, Hxy, Hyy and Hyy. In the present example, the adaptive equalizer has two inputs noted Xin and Yin that corresponds to the two polarizations and that contains the two quadrature components (real part and imaginary part). The outputs Xout and Yout of the adaptive equalizer are given by:

$$\begin{pmatrix} Xout[k] \\ Yout[k] \end{pmatrix} = \sum_{l=0}^{N-1} \begin{pmatrix} H_{xx}[l]Xin[k+l] + H_{xy}[l]Yin[k+l] \\ H_{yx}[l]Xin[k+l] + H_{yy}[l]Yin[k+l] \end{pmatrix}$$

where N is the number of taps in the FIR filters, Hxx, Hxy, Hyx and Hyy are vectors of length N comprising the tap weights, Xin and Yin are sliding blocks of N samples to which the filter is applied, k is the sampling time index and l the filter tap index.

The taps of the FIR filters of the adaptive equalizer are updated by an equalization algorithm such as a constant modulus algorithm (CMA). CMA is a blind adaptation algorithm (the bits to decode are not known) that adjusts the filter coefficients of the equalizer to reduce the inter-symbol interference of the received signal. The algorithm assumes that the transmitted signal is a constant modulus signal, i.e. its amplitude is constant (this is the case for instance with quadrature phase shift keying (QPSK) modulation format). The tap weights are then updated by:

$H_{xx}[k+1,l] = H_{xx}[k+1,l] + \mu\delta\epsilon_1 Xout[k]\overline{Xin}[k+l]$ $H_{xy}[k+1,l] = H_{xy}[k+1,l] + \mu\delta\epsilon_1 Xout[k]\overline{Yin}[k+l]$ $H_{yx}[k+1,l] = H_{yx}[k+1,l] + \mu\delta\epsilon_2 Yout[k]\overline{Xin}[k+l]$ $H_{yy}[k+1,l] = H_{yy}[k+1,l] + \mu\delta\epsilon_1 Yout[k]\overline{Yin}[k+l]$ with $\overline{Xin}$ the complex conjugate of Xin, $\mu$ the convergence parameter, $\delta\epsilon_1$ and $\delta\epsilon_2$ are estimates of the derivative of the modulus errors in the produced complex digital signal values and are given by $\delta\epsilon_1 = \alpha^2 - Xout^2, \delta\epsilon_2 = \alpha^2 - Yout^2$ where $\alpha$ is the targeted signal amplitude.

Alternate equalization algorithms may also be applied instead of the CMA such as a least-mean square (LMS) algorithm, a decision directed (DD) algorithm or a zero-forcing (ZF) algorithm.

Besides, it has to be noted that the adaptive equalizer is also capable of compensating for potential residual degradations due to chromatic dispersion, the amount of degradations due to chromatic dispersion the adaptive equalizer is capable of processing depending on the number of taps (the higher the number of taps and the higher the amount of degradations due chromatic dispersion that can be compensated for). Indeed, as the amount of chromatic dispersion transmitted in the control channel is only an estimation of the real amount of chromatic dispersion undergone by a packet, a small amount of degradations due to chromatic dispersion may still remain at the output of the electronic dispersion compensation module and the adaptive equalizer may be configured to compensate for these remaining degradations due to chromatic dispersion. Besides, as these remaining degradations due to intra-channel chromatic dispersion are low, the convergence time of the adaptive equalizer is greatly reduced with respect to the convergence time in the case of large degradations due to a high amount of intra-channel chromatic dispersion (as it is the case at the input of the electronic dispersion compensation module) so that the adaptive equalizer applies a fine compensation of the remaining degradations due to intra-channel chromatic dispersion in a small amount of time.

The digital processing means 47 described in FIG. 5 previously are provided through the use of a dedicated hardware as well as hardware capable of executing software in association with appropriate software dedicated to the signal processing. When provided by a processor, the digital processing means 47 may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardwares, conventional and/or custom, may also be included.

Figure 7:
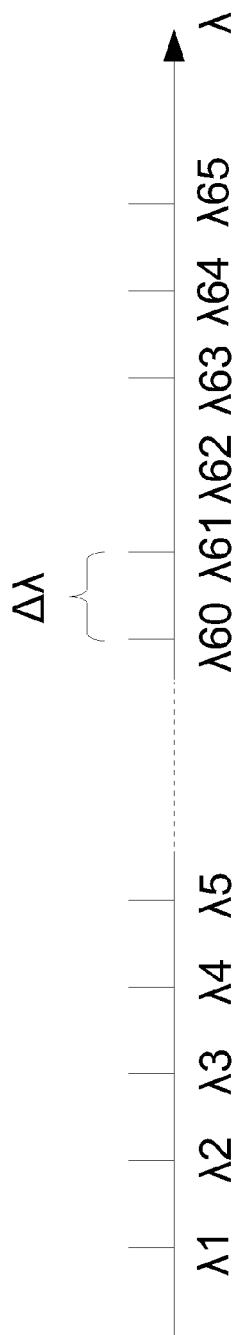
FIG. 7 is a diagram of a spectrum grid comprising a plurality of wavelength channels.
Figure 8:
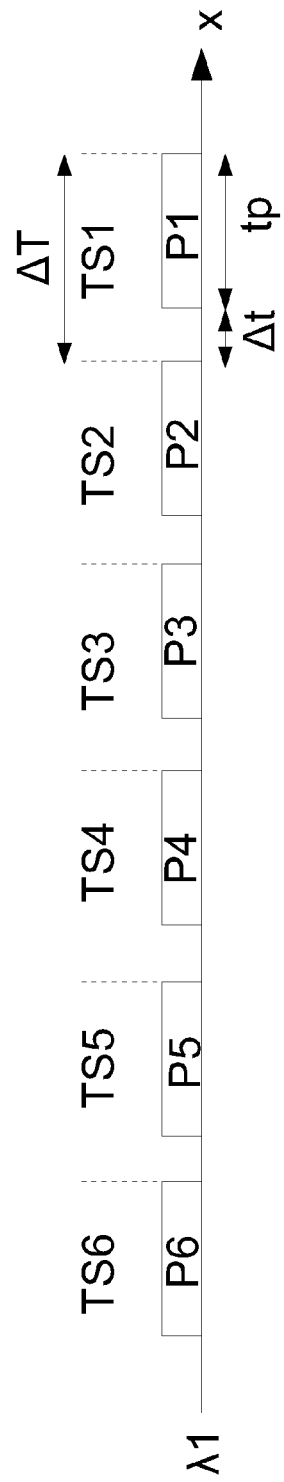
FIG. 8 is a diagram of the arrangements of the packets in the time slots of a wavelength channels.

In order to better understand the functioning of the POADM 1 described previously, an example will now be described based on a WDM signal with sixty-five channels noted from $\lambda 1$ to $\lambda 65$, and distributed in a spectral grid with a channel spacing $\Delta\lambda$, along a wavelength axis $\lambda$ as represented schematically in FIG. 7. The channel $\lambda 65$ is the control channel $\lambda ct$. FIG. 8 represents the arrangement of packets, noted P1 . . . P6 within the corresponding time slots, noted TS1 . . . TS6, of a channel, $\lambda 1$ in the present case along the axis of an optical fiber x. A time slot duration $\Delta T$ corresponds to a packet duration tp and an inter-packet gap duration or guardband duration $\Delta t$.

The first step which is performed at the configuration of the network is the determination of the maximum number of channels that can be gathered in a band. As described previously, two parameters need to be taken into account for this determination.

First, the maximum number of channels that can be processed with the implemented coherent receivers without introducing too much penalties is needed. This number depends on the technology of the coherent receivers and is typically in the coherent receivers of the state of the art equal to ten, which means that no more than ten channels can be gathered in a band.

Then, the time offset introduced by the chromatic dispersion between two channels of a band along any transparent path of the network has to remain shorter than an inter-packet gap $\Delta t$.

Thus, the length of the longest transparent path that a packet may possibly traveled within the network is determined Knowing this maximum length and the features of the links (induced chromatic dispersion per length unit), the time offset introduced by the chromatic dispersion along this maximum length between two channels spaced apart from a given wavelength interval can be determined and compared to the inter-packet gap $\Delta t$. In the present example, the maximum wavelength interval that produces an offset shorter than $\Delta t$ corresponds for instance to seven channel spacings $\Delta\lambda$. In such case, the maximum number of channels in a band has to be limited to eight. Thus, the POADM 1 of the network is configured to process bands having a maximum of eight channels. In the present case, with sixty-five channels, the channels can be gathered in eight bands having each eight channels plus the control channel $\lambda ct$. As a consequence, eight packet add/drop structures 11 are required in the POADM 1 of each node of the network to process the sixty-four data channels.

Figure 9:
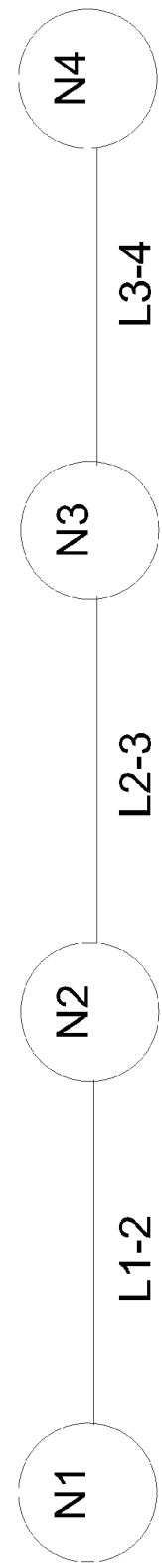
FIG. 9 is a diagram of a network portion.

FIG. 9 represents an example of a network path with four nodes noted N1 (1=1, 2 . . . 4) linked by three links L1-2, L2-3 and L3-4 respectively between nodes N1-N2, N2-N3 and N3-N4. The optical nodes N1 (1=1 . . . 4) comprises a POADM 1 implemented as described in FIGS. 1 to 3. The sixty-five multiplexed channels are transmitted from node N1 toward node N4 through nodes N2 and N3. At a given time, two packets need to be transmitted at the same time from node N1 to node N3.

These two packets are placed in channels $\lambda 1$ and $\lambda 9$ which correspond to two different bands. Indeed, as described previously, only packets of different bands can be dropped simultaneously.

Figure 10:
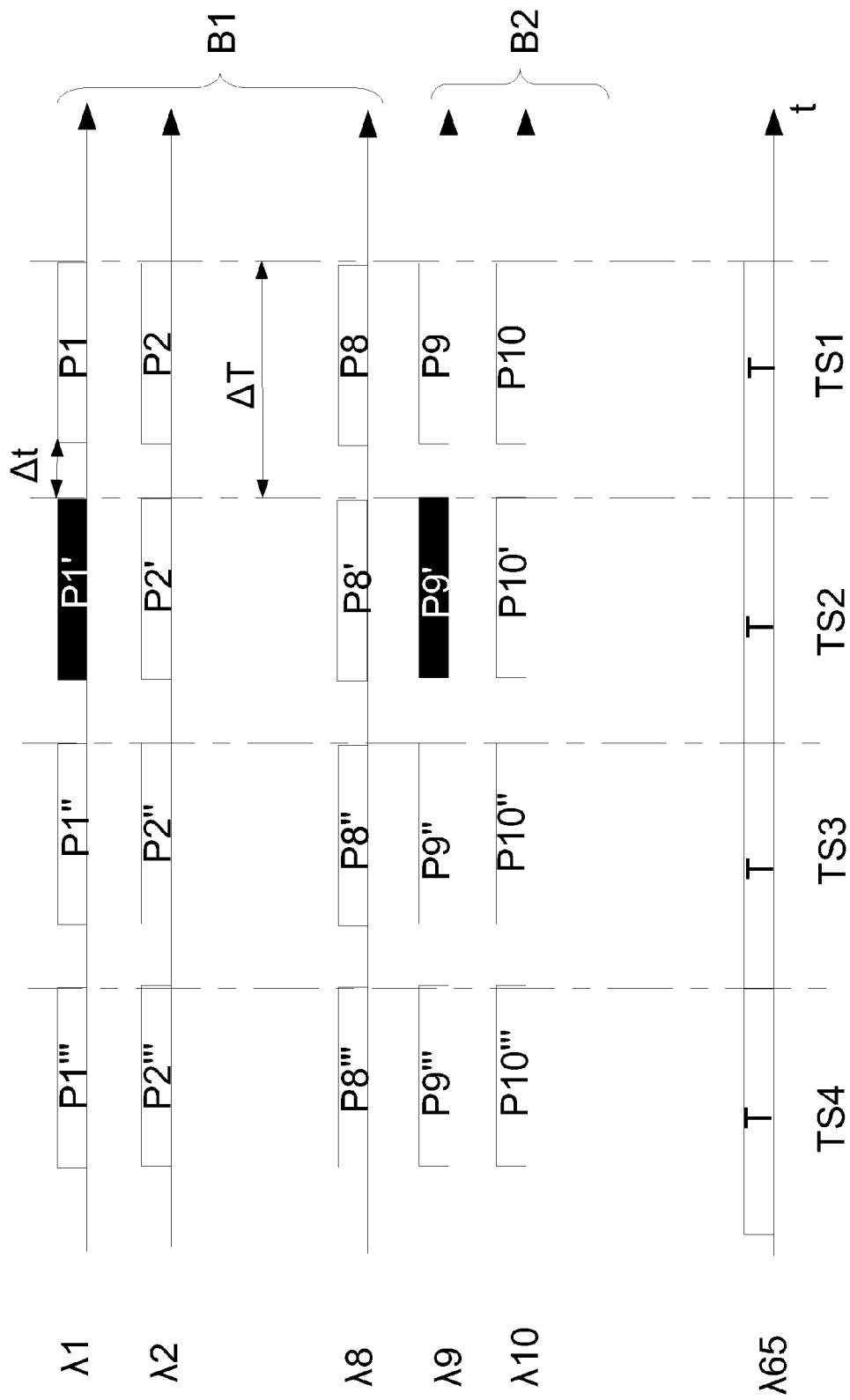
FIG. 10 is a diagram of the packets in their time slots at the ingress node.

FIG. 10 represents the arrangement of the packets in their time slots at the ingress node N1 for the set of sixty-five channels. For sake of clarity, only 6 channels noted $\lambda 1$, $\lambda 2$, $\lambda 8$, $\lambda 9$, $\lambda 10$ and $\lambda 65$ are represented. Channels $\lambda 1$, $\lambda 2$ and $\lambda 8$ belong to band B1, channels $\lambda 9$ and $\lambda 10$ belong to band B2 and channel $\lambda 65$ is the control channel $\lambda ct$. The represented time interval corresponds to four time slots noted TS1, TS2, TS3 and TS4. The two packets of interest that need to be transmitted to node N3 are coloured in black and are noted P1' and P9'. These two packets are sent within time slot TS2 in channels $\lambda 1$ and $\lambda 9$ respectively. The other packets are aimed to node N4.

Figure 11:
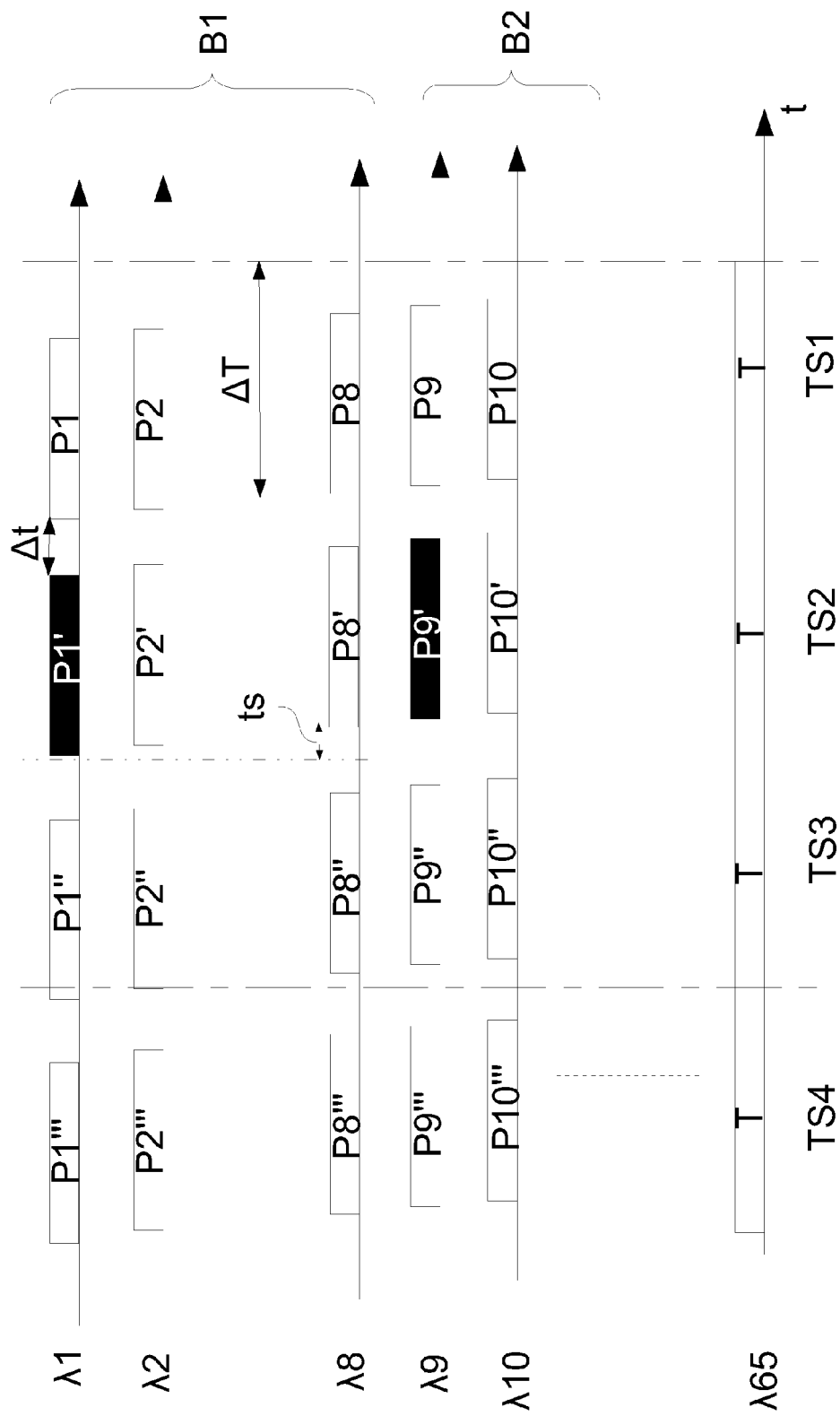
FIG. 11 is a diagram of the packets in their time slots at the input of an intermediary node.

These channels are multiplexed and sent by node N1 to node N2 through the link L1-2. FIG. 11 represents the arrangements of the packets when they are received at the input of the node N2. The control channel $\lambda 65$ is considered to be the reference so that the time slots in FIG. 11 are set according to the frames T of the control channel $\lambda 65$. Due to the inter-channel chromatic dispersion, the other channels are time shifted with respect to the control channel. The packets of channel $\lambda 1$ that has the largest wavelength difference with respect to the control channel $\lambda 65$ have the largest time offset with respect to the start of the frame T of the control channel $\lambda 65$. However, the time shift or time offset between two channels within a band, for example the time shift ts between channel $\lambda 1$ and channel $\lambda 8$ remains shorter than the inter-packet gap $\Delta t$ (in practice, packet P1' is still ahead of packet P8" which belongs to the next time slot TS3).

Figure 12:
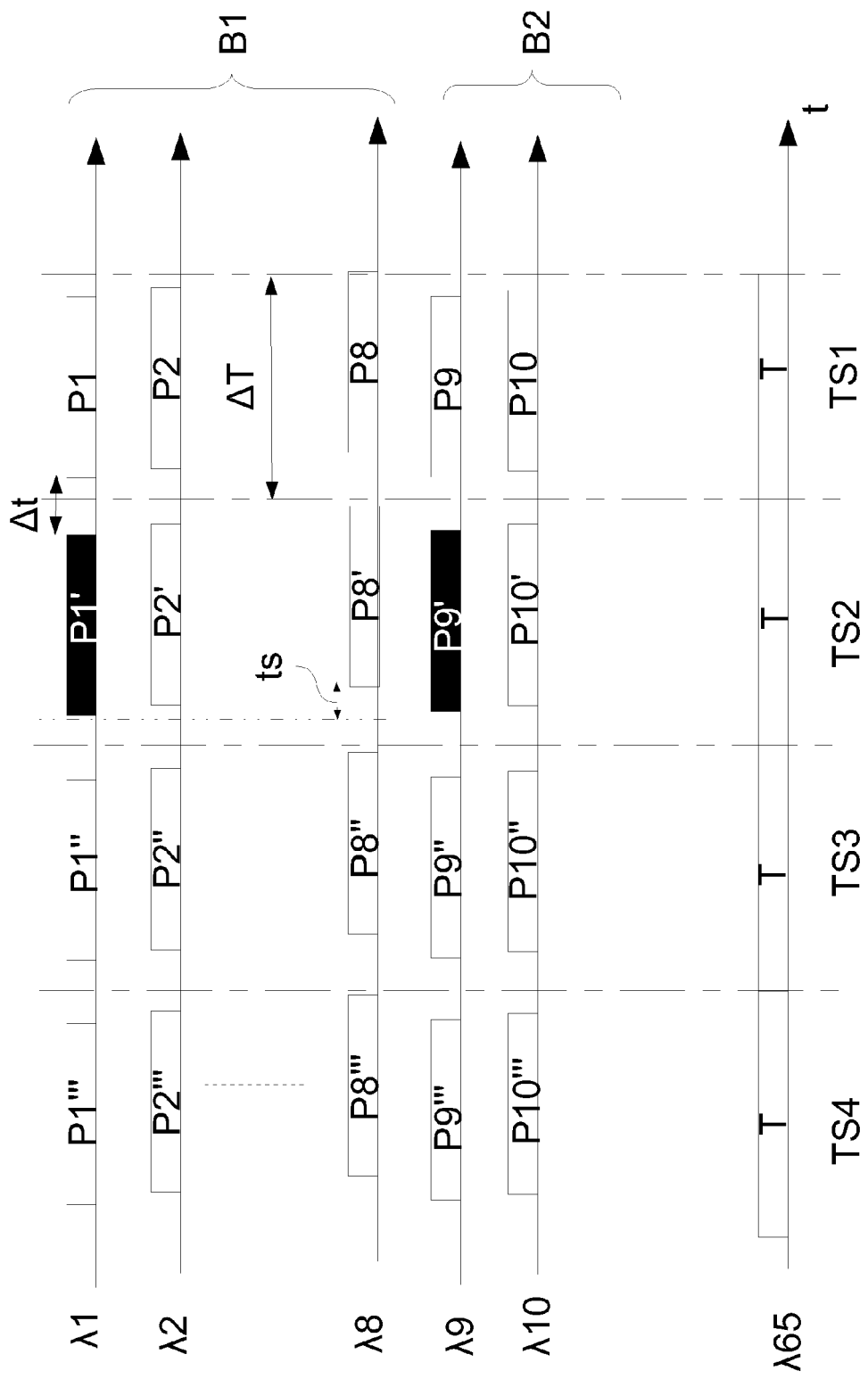
FIG. 12 is a diagram of the packets in their time slots at the output of an intermediary node.

The data transmitted by the control channel $\lambda 65$ are then detected by the dedicated receiver. Indeed, the control channel $\lambda 65$ is demodulated and the data transmitted in the control channel $\lambda 65$ are detected in each node. The information about the chromatic dispersion is updated with the chromatic dispersion undergone along the link N1-N2 for each of the packets transmitted along the other channels (channels $\lambda 1$ to $\lambda 64$). As no packet is dropped in node N2, these updated information are encoded, modulated and emitted by the dedicated transmitter to be re-multiplexed with the other channels (channels $\lambda 1$ to $\lambda 64$) which have been transmitted transparently by the POADM 1 of node N2. However, due to the delay lines 13, the bands B1, B2 . . . B8 are re-synchronized with respect to the control channel, for instance, the last channel of each band is re-synchronized with the control channel as represented in FIG. 12 so that only the small offsets between channels of a common band still remain.

The multiplexed channels are then transmitted from node N2 to node N3.

Figure 13:
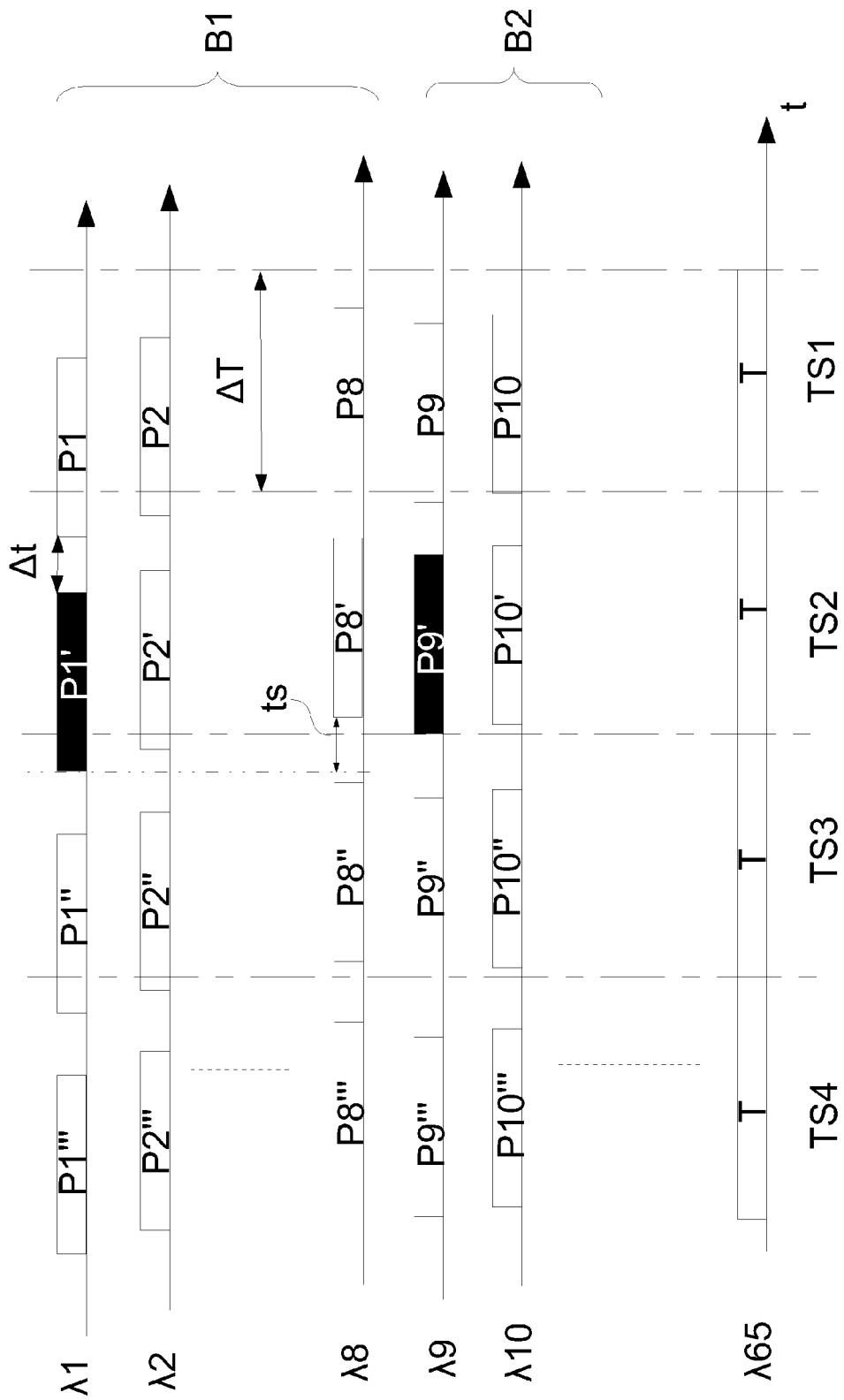
FIG. 13 is a diagram of the packets in their time slots at the input of an egress node.

FIG. 13 represents the arrangements of the packets when they are received at the input of node N3. The time shift ts between channels λ1 and channel λ8 is longer than at the reception in node N2 due to the inter-channel chromatic dispersion undergone between node N2 and node N3 but remains shorter than the inter-packet gap Δt. The data of the control channel λ65 transmitted in the frame T of the time slot TS1 and that comprises the information about the chromatic dispersion of packets P1' and P9' (the transmission of the control data in the previous time slot allows the dedicated receiver 7 to have time to detect and process the data of the control channel corresponding to packets P1' and P9' before the detection of the data packets P1' and P9'). The information about the chromatic dispersion undergone by packets P1' and P9' transmitted in the control channel is retrieved by the dedicated receiver 7. The retrieved value is updated with the value of the chromatic dispersion undergone between node N2 and node N3. The updated values corresponding to packet P1' and P9' are then transmitted respectively to the coherent receivers processing the band B1 and the band B2. When the time slot TS2 is received by the coherent receiver 25 processing the band B1, the local oscillator 41 is tuned on the wavelength corresponding to λ1 and the value transmitted by the dedicated receiver 7 concerning the chromatic dispersion undergone by packet P1' along its travelling through the network (between node N1 and node N3 in the present case) is used to configure the electronic dispersion compensation module of the coherent receiver 25 in order to compensate for the intra-channel chromatic dispersion and to retrieve the data encoded in packet P1'. In the same way, the data encoded in packet P9' are also retrieved by the coherent receiver 25 processing the band B2. Furthermore, the data transmitted in the channels λ1 and λ9 during time slot TS2 are blocked by the optical gates 29 of the packet add/drop structures processing bands B1 and B2 so that new data packets that need to be transmitted toward N4 can be added within time slot TS2 in the channels λ1 and λ9 by the transmitter 35. Besides, the packets that are not dropped in node N3, for instance packet P2', are transmitted transparently through node N3 toward node N4. The information concerning the chromatic dispersion undergone by these non-dropped packets is updated with the value corresponding to the link N2-N3 and the updated value is re-encoded within the control channel to be sent toward N4. Furthermore, the information about the chromatic dispersion undergone by the packets transmitted in channels λ1 and λ9 and time slot TS2 is reset to zero as new packets are emitted from node N3 in these time slots. Thus, in each node the inter-channels chromatic dispersion is compensated per band and the information about the undergone chromatic dispersion is updated in the control channel in order to process the intra-channel chromatic dispersion at destination, allowing thus to deal with both effects of the chromatic dispersion.

Besides, it has to be noticed that the configuration described above enables a compensation of the chromatic dispersion without requiring in-line components such as in-line compensation fibres. As a consequence, such configuration is particularly adapted in the case of a network comprising a combination of equipments providing wavelength granularity capability with equipments providing packets granularity capability. Indeed, structures with packet granularity such as POADMs 1 are more and more implemented due to their higher flexibility with respect to the wavelength packet granularity structures such as the Reconfigurable Optical Add/Drop Multiplexers (ROADMs). However, as ROADM are already implemented and as the packet granularity is interested in the case of low or bursty traffic to optimize the network capacity, a combination of both ROADM and POADM appears to be a good trade-off to limit the capital expenditure while increasing the flexibility of the network.

Figure 14:
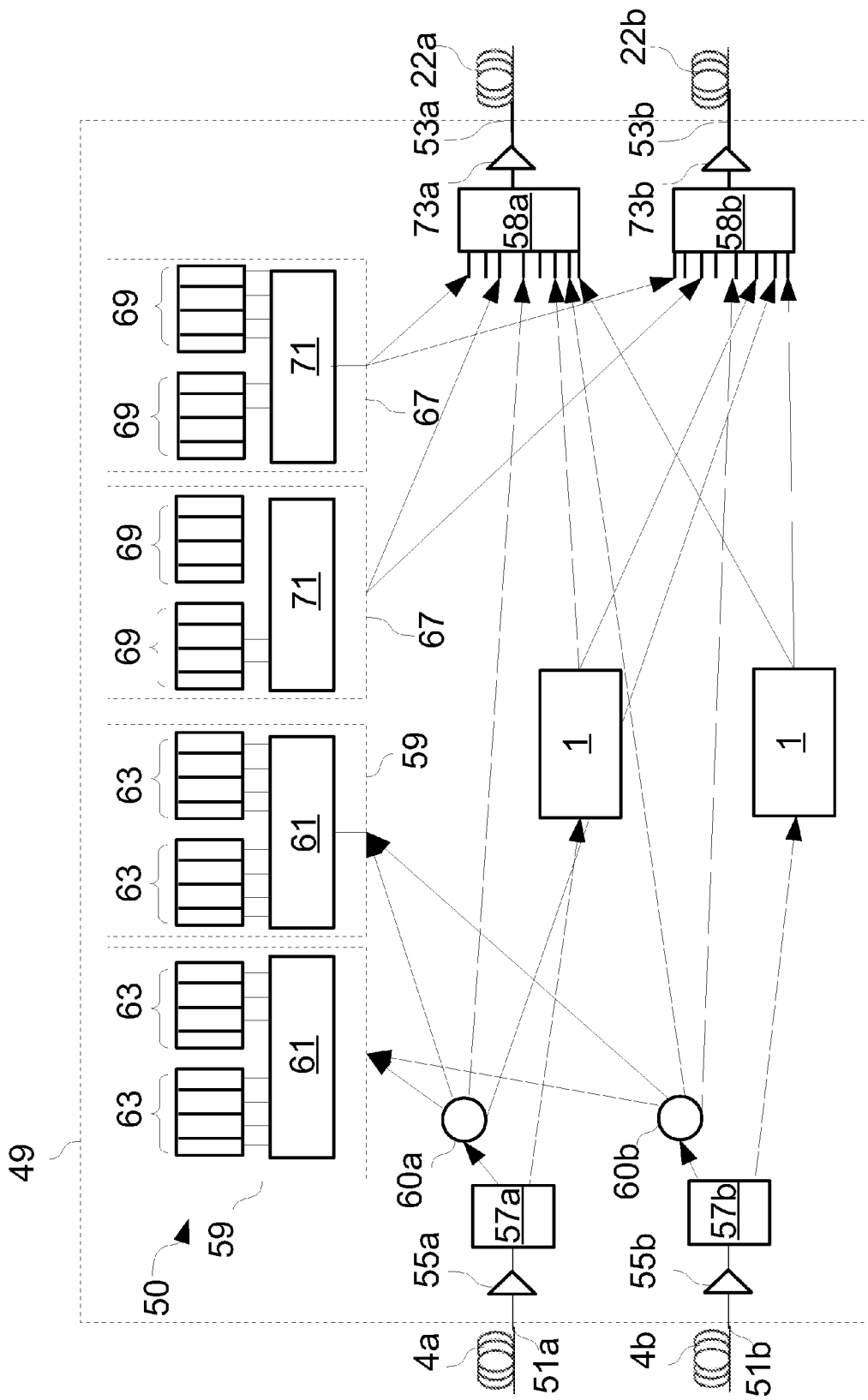
FIG. 14 is a diagram of a node comprising a combination of ROADM and POADM according to a first embodiment.

FIG. 14 represents an example of an optical node 49 that combines a ROADM 50 with two POADMs 1. In practise, only one or more than two POADMs may also be gathered with a ROADM 50.

The represented node 49 comprises two inputs 51a and 51b that receive signals respectively from optical links 4a and 4b and two outputs 53a and 53b that transmits signals to two optical links 22a and 22b. The inputs 51a and 51b are linked respectively to amplifiers 55a and 55b such as an Erbium Doped Fibre Amplifier (EDFA) in order to amplify the received signal. Indeed, as the transmission through the links 4a and 4b induces losses, the received signal comprising a set of channels may need to be amplified to enable a good detection at the receivers. The output of the amplifiers 55a and 55b are respectively linked to demultiplexers 57a and 57b which are configured to split the received signal comprising a plurality of multiplexed channels into two signals comprising each a subset of channels, the first subset corresponding to the channels aimed at being processed by the ROADM 50 and the second subset corresponding to the channels aimed at being processed by a POADM 1. Thus, the demultiplexer 57a and 57b comprise one input and two outputs and may be implemented as 1-to-two WSS. For each demultiplexer 57a and 57b, the first subset is then transmitted to an optical coupler 60a or 60b respectively to transmit the channels either directly to a multiplexer 58a or 58b if they are not dropped or to a drop structure 59 if they are dropped. For example, the WDM signal received at the input 51a may comprise 73 channels, a first subset of 8 channels (from λ66 to λ73) is destined to a drop structure 59 and a second subset of 65 channels (from λ1 to λ65) is destined to the POADM 1. However, among the 8 channels processed by ROADM 50 (from λ66 to λ73), if channels are not dropped in node 49, they are transmitted directly to the multiplexer 58a or 58b to be transmitted transparently toward another node through optical links 22a or 22b. The channels of the second subsets are then transmitted to a first POADM 1 and processed as described previously. The channels of the first subsets that need to be dropped are transmitted to the drop structures 59 where they are demultiplexed by a demultiplexer 61, for example a WSS, to be transmitted individually to a receiver 63 to be detected. In the same way, the channels of the first subset received at the input 51b are transmitted either directly to the multiplexers 58a or 58b or to a drop structure 59 while the channels of the second subsets received at the input 51b are transmitted to a second POADM 1. The ROADM 50 also comprises add structures 67 comprising transmitters 69 configured for emitting signals corresponding respectively to the wavelength of the channels λ66 to λ73 notably. The transmitters 69 are linked to a multiplexer 71 and then to the multiplexers 58a and 58b to be remultiplexed with the channels transmitted transparently and the channels processed by the POADMs 1. Amplifiers 73a and 73b, such as an EDFA, may also be implemented at the output of the multiplexers 58a and 58b before the transmission toward links 22a and 22b in order to compensate for the losses that the WDM signal will undergone along the links 22a and 22b.

Figure 15:
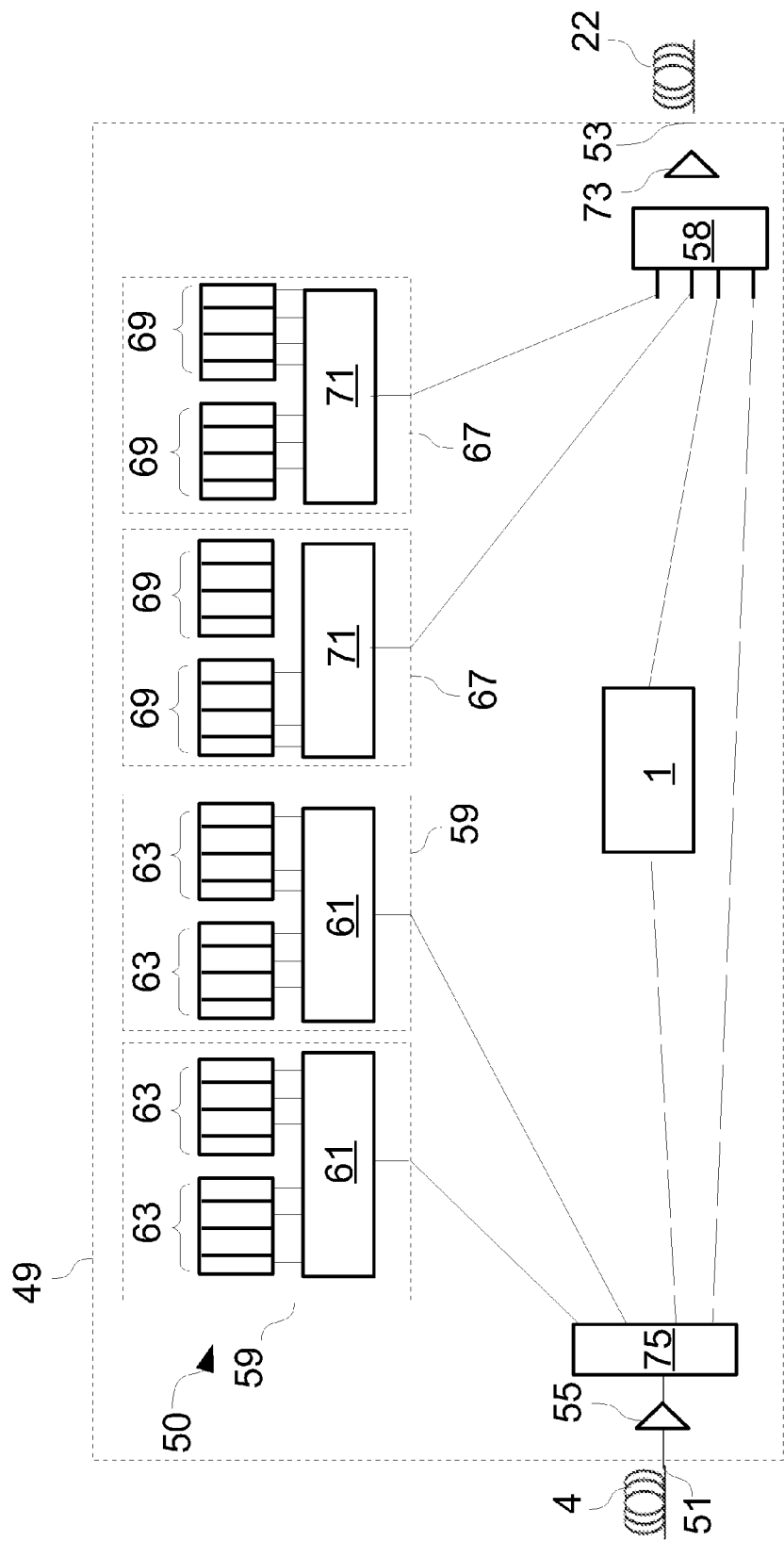
FIG. 15 is a diagram of a node comprising a combination of ROADM and POADM according to a second embodiment.

According to another embodiment represented in FIG. 15 in the case of only one input 51, one output 53 and one POADM 1, the demultiplexer 57 (57a and 57b in FIG. 14) and the optical coupler 60 (60a and 60b in FIG. 14) may be replaced by a single demultiplexer 75 comprising a plurality of outputs linked respectively to the POADM 1, the drop structures 59 and the multiplexer 58 The demultiplexer 75 in then configured to split the received signal in a plurality of signal comprising the subsets of channels aimed respectively to the POADM 1, the drop structures 59 and the multiplexer 58. The demultiplexer 75 may be implemented as a WSS.

Thus, the gathering of adjacent channels in bands, the intra-channel chromatic dispersion compensation using a delay line per band associated with the intra-channel chromatic dispersion compensation using digital signal processing means combined with the transmission of an estimated value of the chromatic dispersion undergone by a packet along its transmission in a control channel enables compensating for both aspects of the chromatic dispersion within a node and in an amount of time compatible with the packet granularity constraints. Furthermore, such compensation does not require any in-line components so that its implementation requires only limited capital expenditures and is particularly adapted to enhance existing wavelength switching equipment with packet granularity capability allowing higher flexibility at a reduced cost.

The invention claimed is:

1. A method for compensating, within a node of an optical network, chromatic dispersion undergone by optical packets transmitted within time slots of wavelength division multiplexed channels along at least one link of the optical network, a time slot duration corresponding to the sum of a packet duration and an inter-packet gap duration, the said method comprising the followings steps:
   demultiplexing the wavelength division multiplexed channels into a plurality of bands, a band comprising a predetermined number of adjacent wavelength channels,
   transmitting the said plurality of bands, via a respective plurality of delay lines having predetermined delays, toward a respective plurality of packet add/drop structures comprising a coherent receiver,
   wherein the said predetermined number of channels of one band is determined so that a first time shift, due to the effect of the chromatic dispersion along transmission through the network, between two optical packets of the same time slot sent respectively in different channels of the same band, remains shorter than an inter-packet gap duration and so that the coherent receiver is capable of processing the said predetermined number of channels of one band,
   wherein the predetermined delay of a delay line associated with a band of channels corresponds to a second time shift between a channel of the said associated band and a reference channel, the said second time shift being due to the effects of chromatic dispersion along the last crossed link.

2. A method in accordance with claim 1 wherein one channel of the wavelength division multiplexed channels corresponds to a control channel and transmits control optical data comprising information about the chromatic dispersion undergone by optical packets transmitted on other wavelength division multiplexed channels than the control channel, the said control channel being demodulated and processed separately by a dedicated receiver and transmitted separately by a dedicated transmitter.

3. A method in accordance with claim 2 wherein the information transmitted by the control channel is decoded by a dedicated receiver when received in a node so that the said information is updated with the value of the chromatic dispersion undergone by optical packets transmitted on other wavelength division multiplexed channels than the control channel along the last crossed link.

4. A method in accordance with claim 2 wherein the coherent receivers comprise an electronic dispersion compensation module and wherein the information about the chromatic dispersion undergone by a dropped optical packet transmitted by the control channel is retrieved by the dedicated receiver and is transmitted to the coherent receiver receiving the dropped optical packet, the electronic dispersion compensation module of the said coherent receiver being configured according to the said information to compensate at least partially for the intra-channel chromatic dispersion.

5. A method in accordance with claim 4 wherein the coherent receivers comprise an adaptive equalizer associated with a constant modulus algorithm to compensate for remaining signal degradations at the output of the electronic dispersion compensation module.

6. A method in accordance with claim 1 wherein a packet add/drop structure also comprises an optical coupler to transmit the band on one side toward the coherent receiver and on the other side toward an input of a demultiplexer configured for demultiplexing channels of a band, the outputs of the said demultiplexer being linked to the inputs of a respective plurality of optical gates configured to free the time slots corresponding to dropped optical packets, the output of the optical gates being connected to the input of a multiplexer configured to remultiplex the channels of the band, the output of the multiplexer being linked to an optical coupler, a transmitter being also linked to the said optical coupler which is configured for adding packets received from the transmitter within the available time slots of the channels of the band, the output of optical coupler being linked to an output of the packet add/drop structure, the said output of the packet add/drop structure being linked to an input of a band multiplexer configured for remultiplexing the remultiplexed bands received from the plurality of add/drop structures.

7. A packet optical add/drop multiplexer located in a node of a wavelength division multiplexing optical network and configured to process optical packets transmitted within time slots having a duration corresponding to a packet duration and an inter-packet gap along links of the optical network and received from remote nodes of the optical network, the said packet optical add/drop multiplexer comprising:
   a plurality of packet add/drop structures comprising a coherent receiver,
   a band demultiplexer configured for demultiplexing the received multiplexed channels into a plurality of bands, a band comprising a predetermined number of adjacent channels, the said predetermined number of channels being determined so that a first time shift, due to the effect of the chromatic dispersion along transmission through the network, between two packets sent respectively in a first and a second channel of the band, remains shorter than an inter-packet gap and so that the coherent receiver is capable of processing the said predetermined number of channels,
   a plurality of delay lines having predetermined delays, the plurality of bands being transmitted respectively to the plurality of packet add/drop structures via the said plurality of delay lines, the predetermined delay of a delay line associated with a band being determined according to a second time shift between a channel of the associated band and a reference channel, the said second time shift being due to the effects of chromatic dispersion along the last crossed link.

8. A packet optical add/drop multiplexer in accordance with claim 7 wherein it also comprises:
   a dedicated transmitter configured for transmitting control optical data in a control channel,
   a dedicated receiver configured for processing control optical data transmitted in a control channel.

9. A packet optical add/drop multiplexer in accordance with claim 8 wherein the dedicated receiver is configured for retrieving information about the chromatic dispersion undergone by the optical packets transmitted on other channels than the control channel, updating the said information and, for the dropped packets, transmitting the said information to the coherent receivers of the packet add/drop structures processing the said dropped optical packets, the said coherent receivers comprising an electronic dispersion compensation module which is configured to receive, from the dedicated receiver, information about the chromatic dispersion undergone by a dropped optical packet and to process the said dropped optical packet according to the said information.

10. A packet optical add/drop multiplexer in accordance with claim 9 wherein the packet add/drop structures also comprises:
 a demultiplexer,
 a plurality of optical gates,
 a multiplexer,
 a transmitter,
 a first optical coupler to transmit the band on one side toward the coherent receiver and on the other side toward an input of the demultiplexer configured for demultiplexing channels of a band, the outputs of the said demultiplexer being linked respectively to the plurality of optical gates configured to free the time slots corresponding to dropped optical packets, the output of the plurality of optical gates being connected to a multiplexer configured to remultiplex the channels of the band,
 a second optical coupler to receive the band transmitted from the multiplexer and to insert the optical packets transmitted from the transmitter in the free time slots of the band,
 and wherein the packet optical add/drop multiplexer also comprises a band multiplexer configured for remultiplexing the bands received from the plurality of add/drop structures.

11. A packet optical add/drop multiplexer in accordance with claim 7 wherein the band demultiplexer is implemented as a wavelength selective switch.

12. An optical node of a wavelength division multiplexing optical network comprising a plurality of nodes linked by optical links comprising:
 a data repository configured for storing information about the topography of the links adjacent to the node,
 a packet optical add/drop multiplexer further comprising:
  a plurality of packet add/drop structures comprising a coherent receiver;
  a band demultiplexer configured for demultiplexing the received multiplexed channels into a plurality of bands, a band comprising a predetermined number of adjacent channels, the said predetermined number of channels being determined so that a first time shift, due to the effect of the chromatic dispersion along transmission through the network, between two packets sent respectively in a first and a second channel of the band, remains shorter than an inter-packet gap and so that the coherent receiver is capable of processing the said predetermined number of channels, and
  a plurality of delay lines having predetermined delays, the plurality of bands being transmitted respectively to the plurality of packet add/drop structures via the said plurality of delay lines, the predetermined delay of a delay line associated with a band being determined according to a second time shift between a channel of the associated band and a reference channel, the said second time shift being due to the effects of chromatic dispersion along the last crossed link;
 wherein a dedicated receiver is configured for updating information about the chromatic dispersion undergone by the optical packets transmitted on other channels than the control channel based on the information about the topography of the links adjacent to the node stored in the data repository.

13. An optical node in accordance with claim 12 further comprising:
 a reconfigurable optical add/drop multiplexer,
 a demultiplexer configured for separating a first subset of wavelength channels destined to the packet optical add/drop multiplexer from a second subset of wavelength channels destined to the reconfigurable optical add/drop multiplexer and for transmitting the said first and second subsets respectively to the packet optical add/drop multiplexer and to the reconfigurable optical add/drop multiplexer.

* * * * *